(12) United States Patent
Kang

(10) Patent No.: US 12,038,054 B2
(45) Date of Patent: Jul. 16, 2024

(54) CALIPER BRAKE

(71) Applicant: HL MANDO CORPORATION, Pyeongtaek (KR)

(72) Inventor: Dong Koo Kang, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 359 days.

(21) Appl. No.: 17/624,365

(22) PCT Filed: Mar. 12, 2020

(86) PCT No.: PCT/KR2020/003485
§ 371 (c)(1),
(2) Date: Jan. 3, 2022

(87) PCT Pub. No.: WO2021/006458
PCT Pub. Date: Jan. 14, 2021

(65) Prior Publication Data
US 2022/0356917 A1 Nov. 10, 2022

(30) Foreign Application Priority Data

Jul. 5, 2019 (KR) .......................... 10-2019-0081621

(51) Int. Cl.
*B60T 11/236* (2006.01)
*F16D 55/226* (2006.01)
(Continued)

(52) U.S. Cl.
CPC .......... *F16D 55/226* (2013.01); *B60T 11/236* (2013.01); *F16D 65/183* (2013.01); *F16D 2121/04* (2013.01); *F16D 2125/08* (2013.01)

(58) Field of Classification Search
CPC .. F16D 55/226; F16D 65/183; F16D 2121/04; F16D 2125/08; F16D 65/18; B60T 11/236; F16J 15/32
See application file for complete search history.

(56) References Cited

U.S. PATENT DOCUMENTS

| 3,915,461 A | * | 10/1975 | Gautier ..................... F16J 15/32 |
| | | | 188/196 P |
| 4,058,084 A | * | 11/1977 | Kawaguchi ............. F16D 65/18 |
| | | | 277/587 |

(Continued)

FOREIGN PATENT DOCUMENTS

| CN | 102292566 A | 12/2011 |
| JP | H06249275 A | 9/1994 |

(Continued)

OTHER PUBLICATIONS

International Search Report issued on Jul. 8, 2020.
CN OA dated Dec. 18, 2023.

*Primary Examiner* — Thomas W Irvin
(74) *Attorney, Agent, or Firm* — Harvest IP Law, LLP

(57) ABSTRACT

Disclosed herein a caliper brake includes a carrier in which a pair of pad plates are installed to move forward and backward toward a disk; a caliper housing slidably installed on the carrier and provided with a cylinder; a piston installed in the cylinder and configured to move forward and backward toward the pair of pad plates by a braking hydraulic pressure; a seal member in close contact with an outer surface of the piston and an inner surface of the cylinder, the seal member having a ring-shaped; and a seal groove formed to be recessed in the inner surface of the cylinder to accommodate the seal member, the seal groove including a front braking surface facing a front surface of the seal member; wherein the front braking surface includes a protrusion protruding toward the seal member.

10 Claims, 4 Drawing Sheets

(51) Int. Cl.
   *F16D 65/18*     (2006.01)
   *F16J 15/32*     (2016.01)
   *F16D 121/04*        (2012.01)
   *F16D 125/08*        (2012.01)

(56) References Cited

U.S. PATENT DOCUMENTS

| | | | | |
|---|---|---|---|---|
| 4,156,532 | A * | 5/1979 | Kawaguchi | F16D 65/18 |
| | | | | 277/587 |
| 4,387,901 | A * | 6/1983 | Ritsema | F16D 65/18 |
| | | | | 277/587 |
| 5,076,593 | A * | 12/1991 | Sullivan | F16J 15/3204 |
| | | | | 277/587 |
| 5,826,681 | A * | 10/1998 | Kubo | F16D 65/18 |
| | | | | 188/72.4 |
| 6,044,936 | A * | 4/2000 | Matsumoto | F16D 65/18 |
| | | | | 277/377 |
| 6,244,393 | B1 * | 6/2001 | Weidenweber | F16D 65/18 |
| | | | | 188/72.3 |
| 6,347,689 | B1 * | 2/2002 | Ohishi | F16D 65/18 |
| | | | | 277/439 |
| 7,191,875 | B2 * | 3/2007 | Kurimoto | F16J 15/164 |
| | | | | 277/587 |
| 7,249,660 | B2 * | 7/2007 | Mackiewicz | F16D 65/14 |
| | | | | 188/326 |
| 8,448,754 | B2 * | 5/2013 | Kubic | F16J 15/3216 |
| | | | | 277/587 |
| 8,794,396 | B2 * | 8/2014 | Chelaidite | F16D 55/10 |
| | | | | 277/455 |
| 8,881,874 | B2 * | 11/2014 | Kong | F16D 65/567 |
| | | | | 188/72.4 |
| 8,914,211 | B2 * | 12/2014 | Watanabe | B60T 13/741 |
| | | | | 701/70 |
| 9,919,686 | B2 * | 3/2018 | Stahl | F16J 15/164 |
| 11,953,123 | B2 * | 4/2024 | Davis | F16J 15/32 |
| 2005/0173215 | A1 * | 8/2005 | Watarai | F16J 15/3204 |
| | | | | 188/26 |
| 2022/0025946 | A1 * | 1/2022 | Kim | F16J 15/18 |
| 2023/0022467 | A1 * | 1/2023 | Kang | B60T 13/588 |
| 2023/0313855 | A1 * | 10/2023 | Ebinuma | F16D 65/0068 |
| | | | | 188/72.4 |
| 2024/0175524 | A1 * | 5/2024 | Davis | F16J 15/32 |

FOREIGN PATENT DOCUMENTS

| | | |
|---|---|---|
| JP | H07301264 A | 11/1995 |
| JP | H0842610 A | 2/1996 |
| JP | 2005249190 A | 9/2005 |
| JP | 2006200579 A | 8/2006 |

* cited by examiner

[FIG. 1]
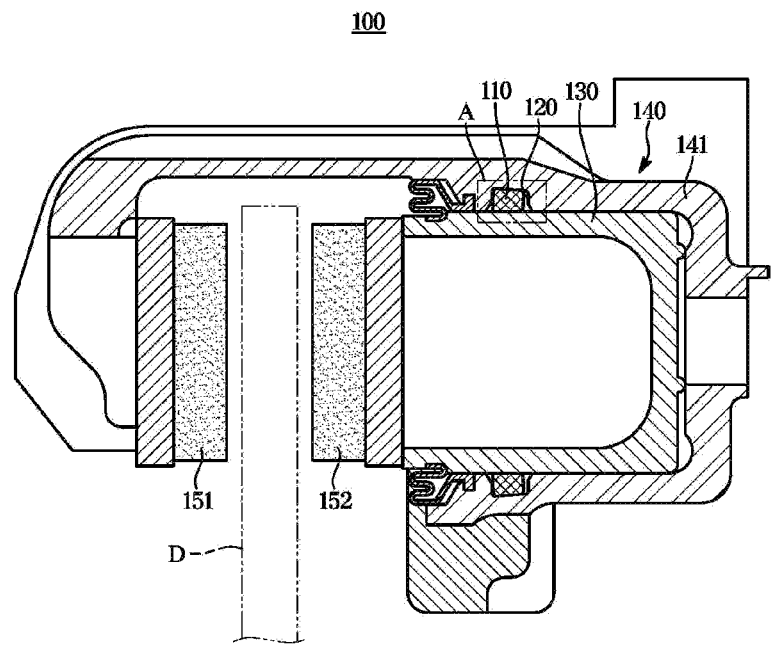
[FIG. 2]
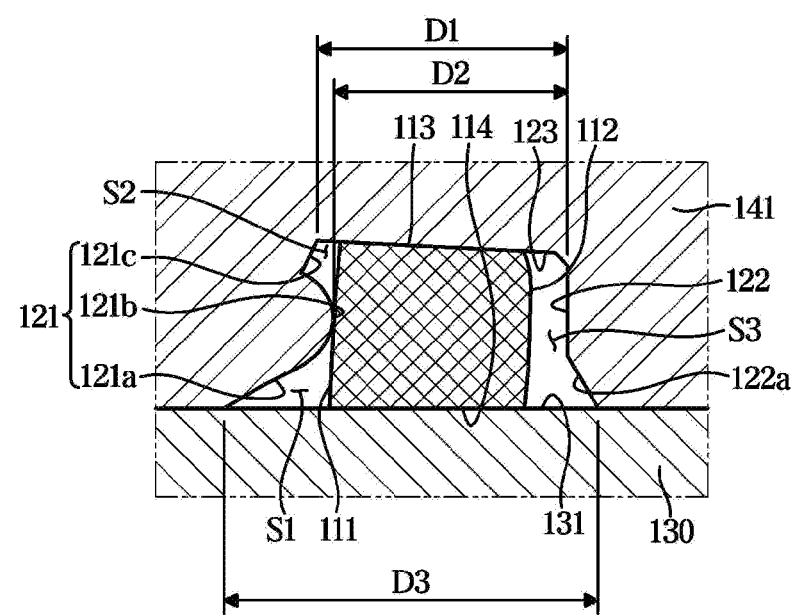

[FIG. 3]
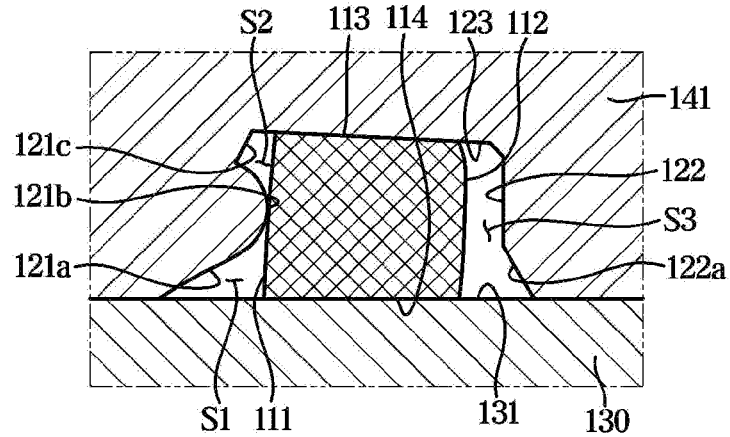
[FIG. 4]
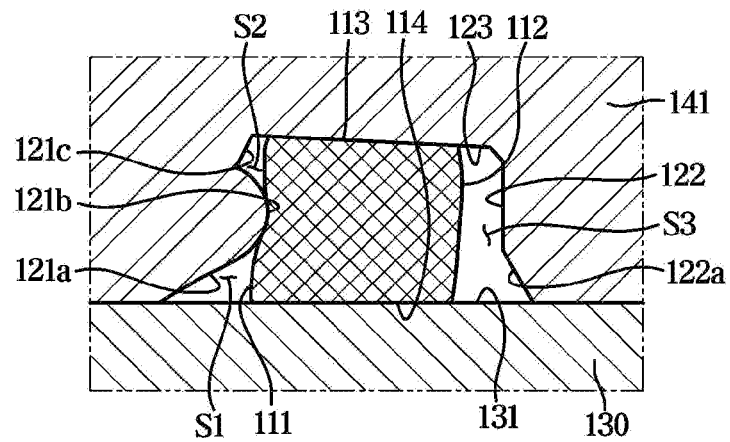
[FIG. 5]
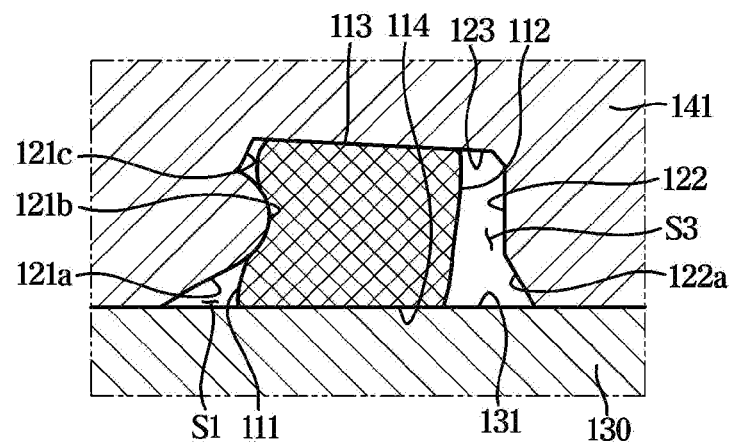

[FIG. 6]
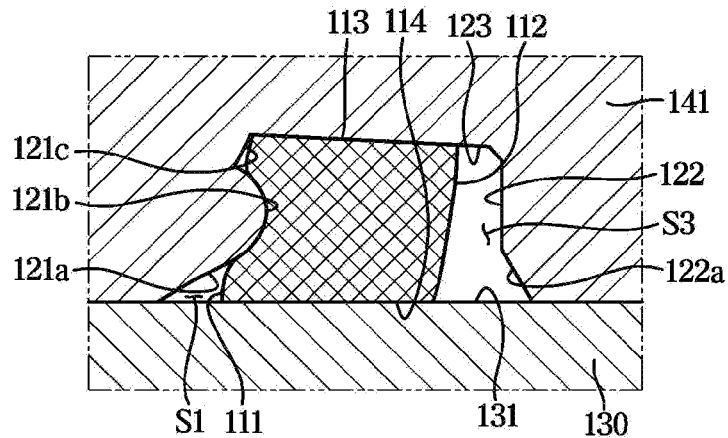
[FIG. 7]
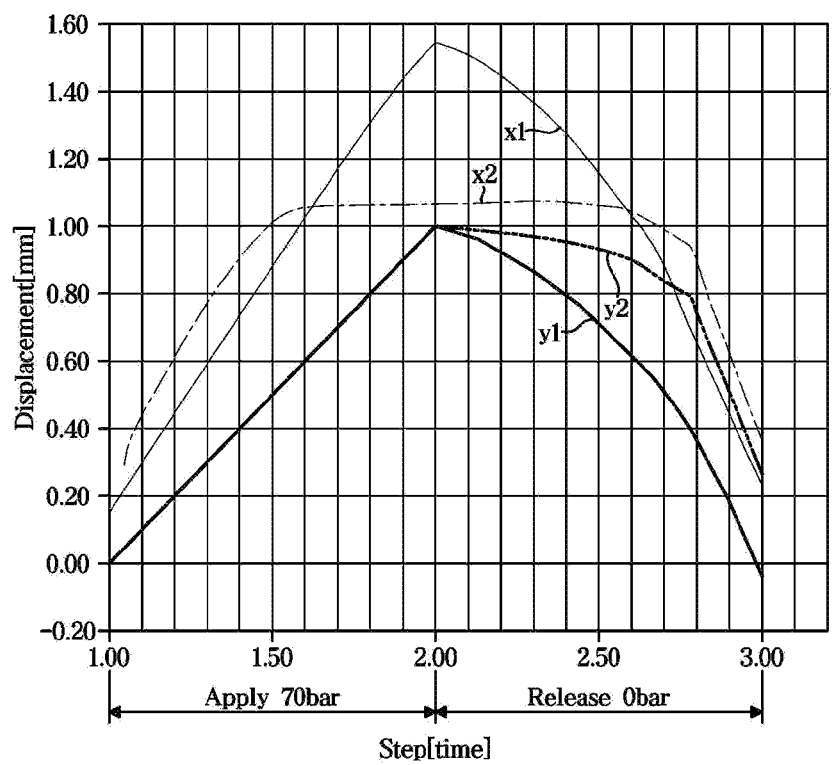

[FIG. 8]
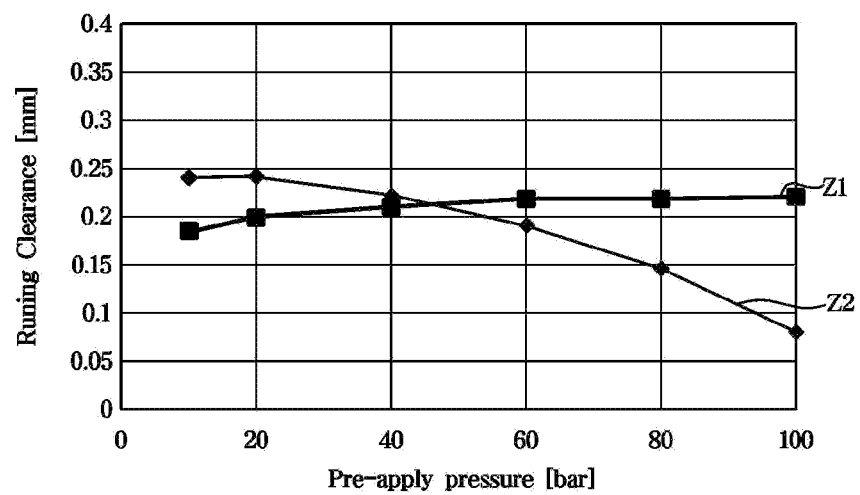

CALIPER BRAKE

CROSS-REFERENCE TO RELATED APPLICATIONS

This application is a National Stage of International Application No. PCT/KR2020/003485 filed Mar. 12, 2020, claiming priority based on Korean Patent Application No. 10-2019-0081621 filed Jul. 5, 2019.

TECHNICAL FIELD

The disclosure relates to a caliper brake, and more particularly, to a caliper brake including a seal member for rolling back a piston when braking is released.

BACKGROUND ART

In general, a caliper brake includes a disk rotating together with wheels of a vehicle, a carrier in which a pair of pad plates are installed to move forward and backward to press the disk, and a caliper housing slidably installed on the carrier. The caliper housing is provided with a cylinder in which a piston moves forward and backward by a braking hydraulic pressure.

Such a caliper brake performs a service braking that pressurizes a piston by a braking hydraulic pressure, and also performs a parking brake that pressurizes the piston using a spindle unit that employs additionally an actuator operated by electricity to receive rotational force of a motor to convert a rotational motion into a linear motion. Generally, to reduce a drag phenomenon in which friction pads, that are attached to a pair of pad plates, and a disk continue to rub after braking operation, a method of retracting the piston using a seal member accommodated in a seal groove recessed in a cylinder and a rollback chamber inside the seal groove is used.

A conventional seal member having a ring shape is inserted into an annular seal groove formed on an inner surface of a cylinder of a caliper housing, and is interposed between an inner surface of the cylinder and an outer surface of the piston. The seal member serves to seal the inner surface of the cylinder and the outer surface of the piston to prevent leakage of a braking fluid and to return the piston to its original position. After operation of braking is completed, the seal member is deformed and restored by elasticity thereof, and the piston, which has moved forward, retracts again to return its original position by the elasticity of the seal member. This is called a roll-back.

However, in a conventional caliper brake, elastic deformation of the seal member is completed during a high pressure braking, but a slip in which a piston continuously advances is occurred. Accordingly, the piston does not return smoothly when braking is released, resulting in occurring drag phenomenon in which the disk and the friction pads are rubbed. To resolve the drag phenomenon, elastic deformation movable range of the seal member may be increased by expanding an inclined surface of the seal groove positioned in a forward movement direction of the piston. However, in this case, due to increasing of a required amount of the braking fluid, when the brake pedal is operated an invalid stroke is increased and a pedal feel is reduced.

DISCLOSURE

Technical Problem

An aspect of the disclosure is to provide a caliper brake capable of fully implementing rollback performance of a seal member when braking is released in spite of a high pressure braking.

Another aspect of the disclosure is to provide a caliper brake capable of preventing a drag phenomenon and improving fuel efficiency of a vehicle by improving rollback performance of a seal member.

Another aspect of the disclosure is to provide a caliper brake capable of preventing premature deformation of a seal member during a low pressure braking to reduce an amount of braking fluid required, thereby reducing an invalid stroke and improving pedal feel of a driver.

Another aspect of the disclosure is to provide a caliper brake capable of improving rollback performance of a seal member, but not affecting assembly efficiency or shortening assembly process time.

Technical Solution

In accordance with an aspect of the disclosure, a caliper brake includes a carrier in which a pair of pad plates are installed to move forward and backward toward a disk; a caliper housing slidably installed on the carrier and provided with a cylinder; a piston installed in the cylinder and configured to move forward and backward toward the pair of pad plates by a braking hydraulic pressure; a seal member in close contact with an outer surface of the piston and an inner surface of the cylinder, the seal member having a ring-shaped; and a seal groove formed to be recessed in the inner surface of the cylinder to accommodate the seal member, the seal groove including a seating surface on which an outer circumferential surface of the seal member is seated, a front braking surface facing a front surface of the seal member, and a rear braking surface facing a rear surface of the seal member; wherein the front braking surface includes a protrusion protruding toward the seal member.

A width $D1$ of the seating surface side of the seal groove may be greater than a width $D2$ of an intermediate portion of the seal groove.

A width $D3$ of the piston side of the seal groove may be greater than the width $D2$ of the intermediate portion of the seal groove.

The width $D3$ of the piston side of the seal groove may be greater than the width $D1$ of the seating surface side of the seal groove.

The seal groove may include a front inclined surface inclined from the front braking surface in a forward direction of the piston; and a rear inclined surface inclined from the rear braking surface in a backward direction of the piston.

The seal member may include the front surface positioned in a forward direction of the piston, the rear surface positioned in a backward direction of the piston, an inner circumferential surface in close contact with the outer surface of the piston, and the outer circumferential surface in close contact with the seating surface, at least a part of the front surface is in close contact with the protrusion when the piston moves forward.

A center of the front surface may be in close contact with the protrusion when the piston moves forward.

The protrusion may protrude at regular intervals along a circumferential direction of the seal groove.

The protrusion may be formed in a middle of the front braking surface.

The protrusion may be formed to be curved on the front braking surface.

An inner space of the seal groove may be divided into a first space positioned in front of the seal member and provided between the seal member and the piston, a second space positioned in front of the seal member and provided between the seal member and the seating surface, and a third space positioned at the rear of the seal member.

The second space may be filled before the first space by elastic deformation of the seal member when the piston moves forward.

A volume of the first space may be a greater than that of the second space.

Advantageous Effects

The embodiments of the disclosure may provide the caliper brake capable of fully implementing rollback performance of the seal member when braking is released in spite of a high pressure braking.

Further, the embodiments of the disclosure may provide the caliper brake capable of preventing a drag phenomenon and improving fuel efficiency of the vehicle by improving rollback performance of the seal member.

Further, the embodiments of the disclosure may provide the caliper brake capable of preventing premature deformation of the seal member during a low pressure braking to reduce an amount of braking fluid required, thereby reducing the invalid stroke and improving pedal feel of a driver.

Further, the embodiments of the disclosure may provide the caliper brake capable of improving rollback performance of the seal member, but not affecting assembly efficiency or shortening assembly process time.

DESCRIPTION OF DRAWINGS

FIG. 1 is a schematic cross-sectional view illustrating a caliper brake according to an embodiment of the disclosure.

FIG. 2 is an enlarged cross-sectional view illustrating a seal member 110 and a seal groove 120 according to an embodiment of the disclosure by enlarging part A of FIG. 1.

FIG. 3 is a cross-sectional view illustrating a state before braking of a caliper brake 100.

FIG. 4 is a cross-sectional view illustrating operation of the seal member 110 during a low pressure braking of a caliper brake 100 according to an embodiment of the disclosure.

FIG. 5 is a cross-sectional view illustrating the operation of the seal member 110 during a medium pressure braking of the caliper brake 100 according to an embodiment of the disclosure.

FIG. 6 is a cross-sectional view illustrating the operation of the seal member 110 during a high pressure braking of the caliper brake 100 according to an embodiment of the disclosure.

FIG. 7 is a graph illustrating displacements of a piston and a seal member of a conventional caliper brake and a caliper brake according to an embodiment of the disclosure, according to a change in a braking hydraulic pressure.

FIG. 8 is a graph illustrating positions of a piston after a conventional caliper brake and a caliper brake according to an embodiment of the disclosure is pressurized, according to a change in a braking hydraulic pressure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Conventionally, a seal member 110 of a caliper brake is provided in a ring shape in which an outer circumferential surface 113 thereof is in close contact with an inner surface of a cylinder 141 and an inner circumferential surface 114 thereof is in close contact with an outer surface of a piston 130. At this time, the seal member 110 is generally provided in a rectangular cross-section.

The seal member 110 seals between the piston 130 and the cylinder 141 and, at the same time, performs a roll-back operation in which the piston 130 advanced by a braking hydraulic pressure returns to its original position when braking is released.

A seal groove 120 is formed to be annularly recessed on the inner surface of the cylinder 141 to accommodate the seal member 110. In particular, the seal groove 120 may include a seating surface 123 on which the outer circumferential surface 113 of the seal member 110 is seated, a front braking surface 121 facing a front surface 111 of the seal member 110, and a rear braking surface 122 facing a rear surface 112 of the seal member 110.

Furthermore, the seal groove 120 may include a front inclined surface 121a formed to be inclined in a forward direction of the piston 130 on the front braking surface 121, and a rear inclined surface 122a formed to be inclined in a backward direction of the piston 130 on the rear braking surface 122.

During a braking operation, the piston 130 advances toward a pad plate by the braking hydraulic pressure. At this time, the outer circumferential surface 113 of the seal member 110 is in close contact with the seating surface 123 of the seal groove 120, and the inner circumferential surface 114 of the seal member 110 is elastically deformed in a state in close contact with the outer circumferential surface of the piston 130.

At this time, during a high pressure braking, elastic deformation of the seal member 110 is completed, but the piston 130 continues to advance, so that a relative slip between the seal member 110 and the piston 130 may occur. Accordingly, when braking is released, the piston 130 is not smoothly returned, so a drag phenomenon in which friction between the disc and the brake pad is generated may occur, thereby causing problems such as a decrease in fuel efficiency of the vehicle.

Furthermore, to solve the problem described above, a method of increasing elastic deformation movable range of the seal member 110 by expanding a width of the front inclined surface 111a and expanding a volume of a space positioned in front of the seal member 110 is proposed. However, when the seal member 110 is elastically deformed, the volume of the space behind the seal member 100 also increases, thereby causing an increase in a required amount of a braking fluid. Accordingly, new problems that an invalid stroke of a brake pedal operation is increased and a pedal feel is deteriorated is created.

Therefore, an embodiment of the disclosure is directed to provide that caliper brake 100 that improves rollback performance to reduce the drag phenomenon of the brake, and at the same time to prevent deterioration of pedal feel due to the invalid stroke of the brake pedal during the braking operation.

FIG. 1 is a cross-sectional view schematically illustrating a caliper brake according to an embodiment of the disclosure, and FIG. 2 is a cross-sectional view illustrating the seal member 110 and the seal groove 120 by enlarging part A of FIG. 1.

Referring to FIGS. 1 and 2, the caliper brake 100 according to an embodiment of the disclosure includes a disc D rotating together with wheels (not shown) of a vehicle, a carrier (not shown) in which a pair of pad plates 151 and 152 are installed to move forward and backward so as to press the disc D, a caliper housing 140 slidably installed on the carrier (not shown) and provided with a cylinder 141, a piston 130 installed in the cylinder 141 and provided to advance and retract toward the pad plate 152 side by the braking hydraulic pressure, a seal member 110 having ring-shaped and in close contact with the outer surface of the piston 130 and the inner surface of the cylinder 141, a seating surface 123 that is recessed in the inner surface of the cylinder 141 to accommodate the seal member 110 and on which the outer circumferential surface 113 of the seal member 110 is seated, a front braking surface 121 opposite to the front surface 111 of the seal member 110, and a seal groove 120 including a rear braking surface 122 opposite to the rear surface 112 of the seal member 110.

The seal groove 120 is formed to be annularly recessed on the inner surface of the cylinder 141 provided in a hollow shape in the caliper housing 140. Furthermore, the seal groove 120 accommodates the seal member 110, and the seal member 110 is interposed between the seal groove 120 and the piston 130 to be in close contact.

Particularly, the seal groove 120 may include the seating surface 123 on which the outer circumferential surface 113 of the seal member 110 is seated, and the front braking surface 121 opposite to the front surface 111 of the seal member 110, and a rear braking surface 122 opposite to the rear surface 112 of the seal member 110.

The seating surface 123 may closely support the outer circumferential surface 113 of the seal member 110 so that the seal member 110 may be elastically deformed through friction with the seal member 110. Furthermore, the seating surface 123 may be inclined so that an inner diameter thereof increases toward the front braking surface 121 side.

The front braking surface 121 may be bent with angled shape from the seating surface 123 to the piston 130 side to face the front surface 111 of the seal member 110.

At least a part of the front braking surface 121 may be curved toward the seal member 110. More particularly, the front braking surface 121 may include a protrusion 121b protruding toward the seal member 110, and the protrusion 121b may be formed in an intermediate portion of the front braking surface 121. Furthermore, the protrusion 121b may be provided in close contact with at least a part of the front surface 111 of the seal member 110.

The front braking surface 121 may maintain a state in close contact with at least a part of the front surface 111 of the seal member 110 in normal, and may be in close contact with the front surface 111 of the seal member 110 due to elastic deformation of the seal member 110 during the braking operation, thereby limiting the movement of the seal member 110.

The front braking surface 121 may be formed in various shapes, which is different from that shown in the drawings, such as a form in which corners thereof has angled, and may form a plurality of protrusions 121b, and if a part of the front braking surface 121 is in close contact with a part of the seal member 110, it will be understood in the same way.

For example, the protrusions 121b may be provided on the front braking surface 121 and formed to protrude in plurality at regular intervals along the circumferential direction of the seal groove 120.

Furthermore, as well as the protrusion 121b protruding from the front braking surface 121, the groove portion 121c provided on the seating surface 123 side also may be designed and changed in various sizes and shapes as needed, and should be understood in the same way.

As described above, because the protrusion 121b may be provided on the front braking surface 121, an axial width of the seal groove 120 may be greater than a width D1 of the seating surface 123 side thereof compared to a width D2 of an intermediate portion thereof. Furthermore, a width D3 of the piston 130 side of the seal groove 120 may be larger than the width D2 of the intermediate portion. Furthermore, because the seal groove 120 is formed with a front inclined surface 121a and a rear inclined surface 122a to be described later, the width D3 of the piston 130 side may be larger than the width D1 of the seating surface 123 side.

The rear braking surface 122 may be formed with angled edge from the seating surface 123 to the piston 130 to face the rear surface 112 of the seal member 110. Herein, the rear braking surface 122 may maintain a spaced apart state from the seal member 110 in normal, and when the seal member 110 is excessively rolled back by the elastic repulsive force while the braking is released, the rear braking surface 122 may be in close contact with the rear surface 112 of the seal member 110 to limit movement thereof.

The seal groove 120 may further include the front inclined surface 121a formed to be inclined in the forward direction of the piston 130 on the front braking surface 121 and the rear inclined surface 122a formed to be inclined in the backward direction of the piston 130 on the rear braking surface 122.

The front inclined surface 121a may be formed from the front braking surface 121, and may be inclined at about 45 degrees in the forward direction of the piston 130 from a depth of about half the depth at which the seating surface 123 is formed. However, the shape of the front inclined surface 121a is not limited thereto, and various modifications are possible, and the depth and angle of the front inclined surface 121a may be changed according to a rollback amount required, and should be understood in the same way.

The rear inclined surface 122a may be formed from the rear braking surface 122, and may be inclined at about 60 degrees in the backward direction of the piston 130 from a depth that is less than half of the depth at which the seating surface 123 is formed. However, the shape of the rear inclined surface 122a is not limited thereto, and various modifications are possible, and the depth and angle of the rear inclined surface 122a may be changed according to the required amount of the braking fluid required, and should be understood in the same way.

The seal member 110 is accommodated in the seal groove 120 so that the inner circumferential surface 114 thereof may be in close contact with the outer surface of the piston 130, and the outer circumferential surface 113 thereof may be provided in a ring-shape in close contact with the inner surface of the seal groove 120.

The seal member 110 includes the front surface 111 positioned in the advance direction of the piston 130 and the rear surface 112 positioned in a retraction direction of the piston 130.

The front surface 111 and the rear surface 112 of the seal member 110 may be provided to be flat and parallel to the front braking surface 121 and the rear braking surface 122 of the seal groove 120. Furthermore, the cross-section of the seal member 110 may be preferably provided in a rectangular shape.

At least a part of the front surface 111 of the seal member 110 may be provided in close contact with a part of the front braking surface 121 of the seal groove 120, and particularly, the intermediate portion of the seal member 110 may be provided in close contact with the projection 121b of the seal groove 120.

Since the front surface 111 of the seal member 110 and the protrusion 121b of the seal groove 120 are provided in close contact, an inner space of the seal groove 120 may be divided into a first space S1 to a third space S3 by the seal member 110. Specifically, the inner space of the seal groove 120 may be divided into the first space S1 positioned in front of the seal member 110 and provided between the seal member 110 and the piston 130, a second space S2 positioned in front of the seal member 110 and provided between the seal member 110 and the seating surface 123, and a third space S3 positioned at the rear of the seal member 110. At this time, the first space S1 may have a larger volume than that of the second space S2.

The first space S1 and the second space S2 are filled with the seal member 110 due to elastic deformation of the seal member 110 during the braking operation, so that the volume thereof may decrease, thereby the volume of the third space S3 may increase. Conversely, the volume of the first space S1 and the second space S2 may be increased due to the returning to its original state of the seal member 110 when braking is released, thereby the volume of the third space S3 may decrease.

Next, the operation of the seal member 110 during the braking operation of the caliper brake 100 according to an embodiment of the disclosure will be described.

FIGS. 3 to 5 are cross-sectional views sequentially illustrating the operation of the seal member 110 during the braking operation of the caliper brake 100 according to an embodiment of the disclosure.

FIGS. 3 to 5 may be seen that the piston 130 advances from a stationary state as the braking hydraulic pressure changes from a low pressure (about 20 to 40 bar) to a high pressure (about 70 bar), and thus, the seal member 110 is elastically deformed gradually.

Specifically, in the stationary state, the seal member 110 is maintained in close contact with the protrusion 121b of the front braking surface 121, and the first space S1, the second space S2 and the third space S3 are separated from each other.

During the braking operation, the seal member 110 elastically deforms in a state in which the outer circumferential surface 113 and the inner circumferential surface 114 are in close contact with the seating surface 123 of the seal groove 120 and the outer circumferential surface of the piston 130, respectively. Furthermore, the seal member 110 moves to the first and second spaces S1 and S2, and thus the volumes of the first and second spaces S1 and S2 decrease. At this time, since the first space S1 has a larger volume than that of the second space S2 due to the front inclined surface 121a, the second space S2 may be filled before the first space S1.

During the high pressure braking, a part of the front surface 111 of the seal member 110 is completely in close contact with the front braking surface 121 of the seal groove 120, and the remaining part thereof moves toward the front inclined surface 121a to fill the second space S2.

Accordingly, the seal member 110 according to an embodiment of the disclosure may be continuously elastically deformed not only under the low pressure braking but also under the high pressure braking, and prevent a slip phenomenon in which the piston 130 moves relative to the seal member 110 even at high pressure.

Furthermore, the seal member 110 according to an embodiment of the disclosure is structurally elastically deformed to fill the second space S2 before the first space S1 during the low pressure braking, so that the volume of the third space S3 does not increase significantly, which prevents an increase in the required amount of the braking fluid during the low pressure braking, thereby reducing the invalid stroke and preventing a decrease in pedal feel.

FIG. 7 is a graph illustrating displacements of the piston 130 and the seal member 110 of the caliper brake 100 of according to an embodiment of the disclosure and a conventional caliper brake 100, according to a change in the braking hydraulic pressure.

As shown in FIG. 7, looking at the displacements y2 and x2 of the piston 130 and the seal member 110 of the conventional caliper brake 100 according to the change in the braking hydraulic pressure, as the braking hydraulic pressure of 70 bar is applied (1 second to 2 seconds), the displacement y2 of the piston increases linearly and finally the displacement y2 reaches 1 mm. At this time, the displacement x2 of the seal member starts from 0.2 mm and increases linearly, and first reaches about 1 mm (about 1.5 seconds), so no further displacement occurs and the same displacement is maintained (1.5 seconds to 2 seconds). This is because the elastic deformation of the seal member 110 is not accomplished according to the displacement of the piston 130 during the high pressure braking, so that the relative slip occurs between the piston 130 and the seal member 110 (1.5 seconds to 2 seconds).

Furthermore, as the braking hydraulic pressure is released (2 to 3 seconds), the displacement y2 of the piston gradually returns to its original position and finally the displacement y2 reaches about 0.3 mm. In addition, the displacement x2 of the seal member is maintained at the same displacement (2 seconds to 2.5 seconds), then gradually returns to its original position, and finally the displacement X2 reaches about 0.4 mm. As described above, the relative slip occurs between the piston 130 and the seal member 110 during the high pressure braking, so that the seal member 110 may not fully implement a rollback function, and as a result, the piston 130 and the seal member 110 may not return to its original positions.

This may cause a fine drag between the brake pad and the disk D due to a non-return of the piston 130, and also cause a decrease in fuel efficiency due to a residual braking torque.

In contrast, looking at the displacements y1 and x1 of the piston 130 and the seal member 110 of the caliper brake 100 according to an embodiment of the disclosure according to the change in the braking hydraulic pressure, as the braking hydraulic pressure of 70 bar is applied, the displacement y1 of the piston increases linearly and finally the displacement y1 reaches 1 mm (1 second to 2 seconds). At this time, the displacement x1 of the seal member starts from 0.2 mm and increases linearly to reach about 1.5 mm (1 second to 2 seconds). This is because the elastic deformation of the seal member 110 is continuously performed according to the displacement of the piston 130 during the high pressure braking, so that the relative slip does not occur between the piston 130 and the seal member 110.

Furthermore, as the braking hydraulic pressure is released, the displacement y1 of the piston 130 gradually returns to its original position and finally the displacement y1 reaches 0 mm (2 seconds to 3 seconds). Furthermore, the displacement x1 of the seal member 110 gradually returns to its original position and finally the displacement x1 reaches about 0.2 mm. As described above, in the embodiment of the disclosure, the relative slip does not occur between the piston 130 and the seal member 110 during the high pressure braking, so that the seal member 110 implements the rollback function, and as a result, the piston 130 and the seal member 110 may return to their original positions.

Hereinafter, a change in the distance between the pad plate and the piston according to an embodiment of the disclosure and the pad plate and the piston according to the conventional embodiment under different braking hydraulic conditions will be described.

FIG. 8 is a graph illustrating positions of the piston with respect to the pad plate according to the change in the brake hydraulic pressure after the braking operations of the conventional caliper brake and the caliper brake according to an embodiment of the disclosure.

FIG. 8 shows that a clearance Z1 between the pad plate and the piston of an embodiment of the disclosure and a clearance Z2 between the pad plate and the piston of the conventional embodiment in different braking hydraulic conditions (10, 20, 40, 60, 80 and 100 bar).

Referring to FIG. 8, it may be seen that the clearance Z2 between the pad plate and the piston of the conventional embodiment is maintained at a certain level (about 0.24 mm) in a low-pressure region (10, 20 bar), but decreases sharply (up to about 0.08 mm) as the clearance z2 between the piston and the piston goes through a middle-pressure region (40, 60 bar) and toward a high-pressure region (80, 100 bar). This is because the slip occurs between the piston and the seal member as the braking hydraulic pressure goes to the high-pressure region, so that the seal member does not smoothly roll back the piston. Accordingly, in the seal member of the conventional embodiment, the clearance Z2 between the pad plate and the piston is decreased after the braking operation due to the slip phenomenon as the braking hydraulic pressure increases to a high pressure, thereby causing drag, which generates a decrease in fuel efficiency and a decrease in durability of the brake pad.

Meanwhile, it may be seen that the clearance Z1 between the pad plate and the piston according to an embodiment of the disclosure is maintained within a certain value (about 0.18~0.22 mm) even when going from the low-pressure region (10, 20 bar) to the high-pressure region (80, 100 bar) through the middle-pressure region (40, 60 bar). This shows that even when the braking hydraulic pressure changes from the low-pressure region to the high-pressure region, the slip does not occur between the piston and the seal member, so that the seal member may smoothly roll back the piston.

In other words, the clearance Z2 between the pad plate and the piston of the conventional embodiment has a change width of 0.16 mm from about 0.24 mm to about 0.08 mm from low pressure to high pressure, whereas the clearance Z1 between the pad plate and the piston of an embodiment of the disclosure has a change width of 0.04 mm from about 0.18 mm to about 0.22 mm from low pressure to high pressure, so that the caliper brake of an embodiment of the disclosure may expect constant rollback performance and braking performance from the low-pressure region to the high-pressure region.

Therefore, the caliper brake according to an embodiment of the disclosure has the advantage of being able to expect constant braking performance even under the braking hydraulic conditions from the low-pressure region to the high-pressure region, and furthermore, prevent the deterioration of fuel efficiency and durability due to the drag phenomenon.

The exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

The invention claimed is:

1. A caliper brake, comprising:
a carrier in which a pair of pad plates are installed to move forward and backward toward a disk;
a caliper housing slidably installed on the carrier and provided with a cylinder;
a piston installed in the cylinder and configured to move forward and backward toward the pair of pad plates by a braking hydraulic pressure;
a seal member in close contact with an outer surface of the piston and an inner surface of the cylinder, the seal member having a ring shaped; and
a seal groove formed to be recessed in the inner surface of the cylinder to accommodate the seal member, the seal groove including a seating surface on which an outer circumferential surface of the seal member is seated, a front braking surface facing a front surface of the seal member, and a rear braking surface facing a rear surface of the seal member;
wherein the front braking surface includes a protrusion protruding toward the seal member, and
a width D1 of a seating surface side of the seal groove is greater than a width D2 of an intermediate portion of the seal groove, and
an inner space of the seal groove is divided into a first space positioned in front of the seal member and provided between the seal member and the piston, a second space positioned in front of the seal member and provided between the seal member and the seating surface, and a third space positioned at a rear of the seal member, and
wherein a volume of the first space is a greater than that of the second space.

2. The caliper brake of claim 1, wherein a width D3 of a piston side of the seal groove is greater than the width D2 of the intermediate portion of the seal groove.

3. The caliper brake of claim 2, wherein the width D3 of the piston side of the seal groove is greater than the width D1 of the seating surface side of the seal groove.

4. The caliper brake of claim 1, wherein the seal groove comprises:
a front inclined surface inclined from the front braking surface in a forward direction of the piston; and
a rear inclined surface inclined from the rear braking surface in a backward direction of the piston.

5. The caliper brake of claim 1, wherein the seal member comprises the front surface positioned in a forward direction of the piston, the rear surface positioned in a backward direction of the piston, an inner circumferential surface in close contact with the outer surface of the piston, and the outer circumferential surface in close contact with the seating surface, and
at least a part of the front surface is in close contact with the protrusion when the piston moves forward.

6. The caliper brake of claim 5, wherein a center of the front surface is in close contact with the protrusion when the piston moves forward.

7. The caliper brake of claim 6, wherein the protrusion protrudes at regular intervals along a circumferential direction of the seal groove.

8. The caliper brake of claim 1, wherein the protrusion is formed in a middle of the front braking surface.

9. The caliper brake of claim 8, wherein the protrusion is formed to be curved on the front braking surface.

10. The caliper brake of claim 1, wherein the second space is filled before the first space by elastic deformation of the seal member when the piston moves forward.

* * * * *